Inventor
Dennis S. Hall
By his Attorney
Richard B. Megley

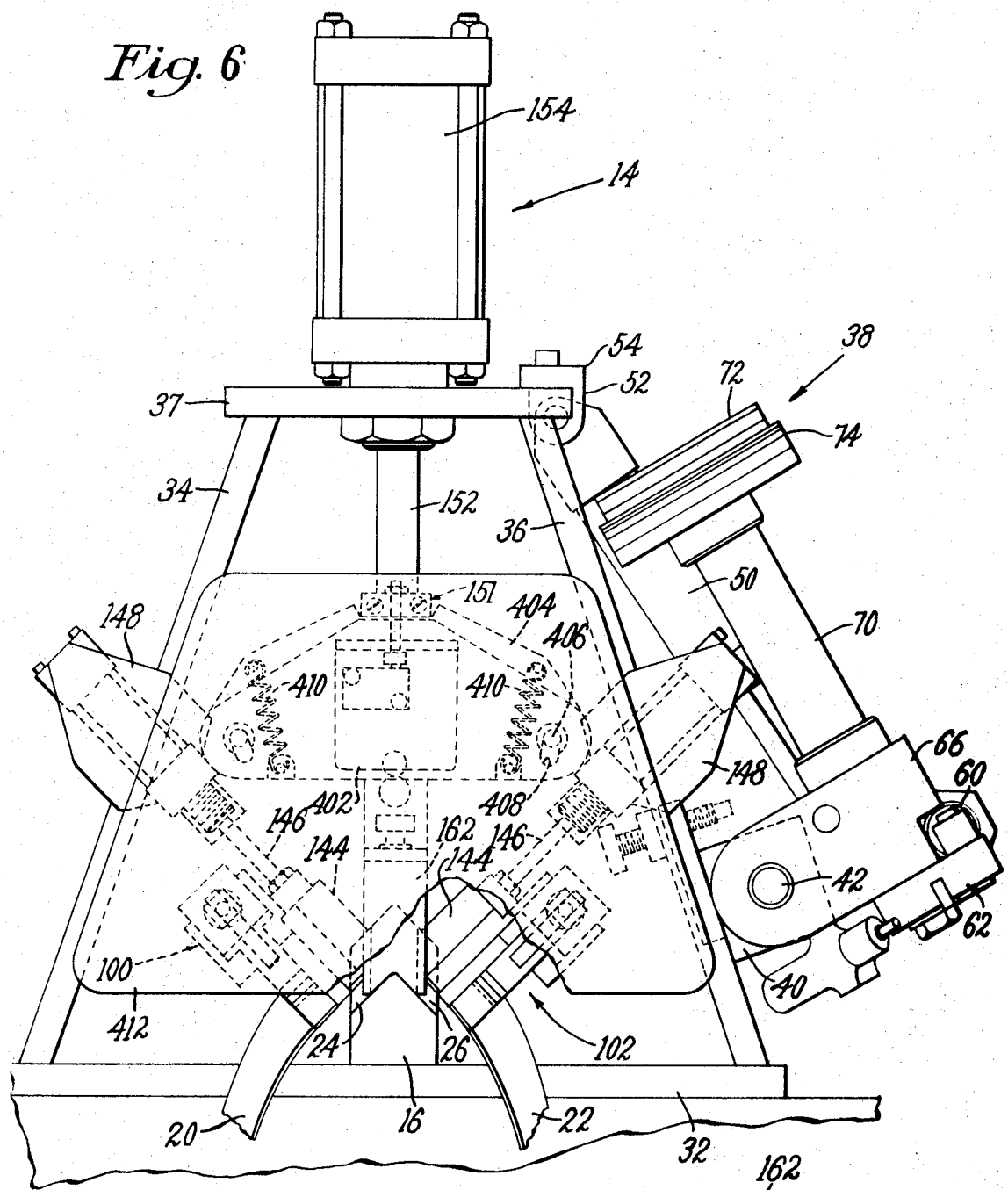
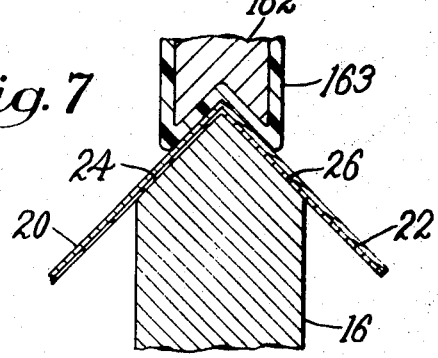

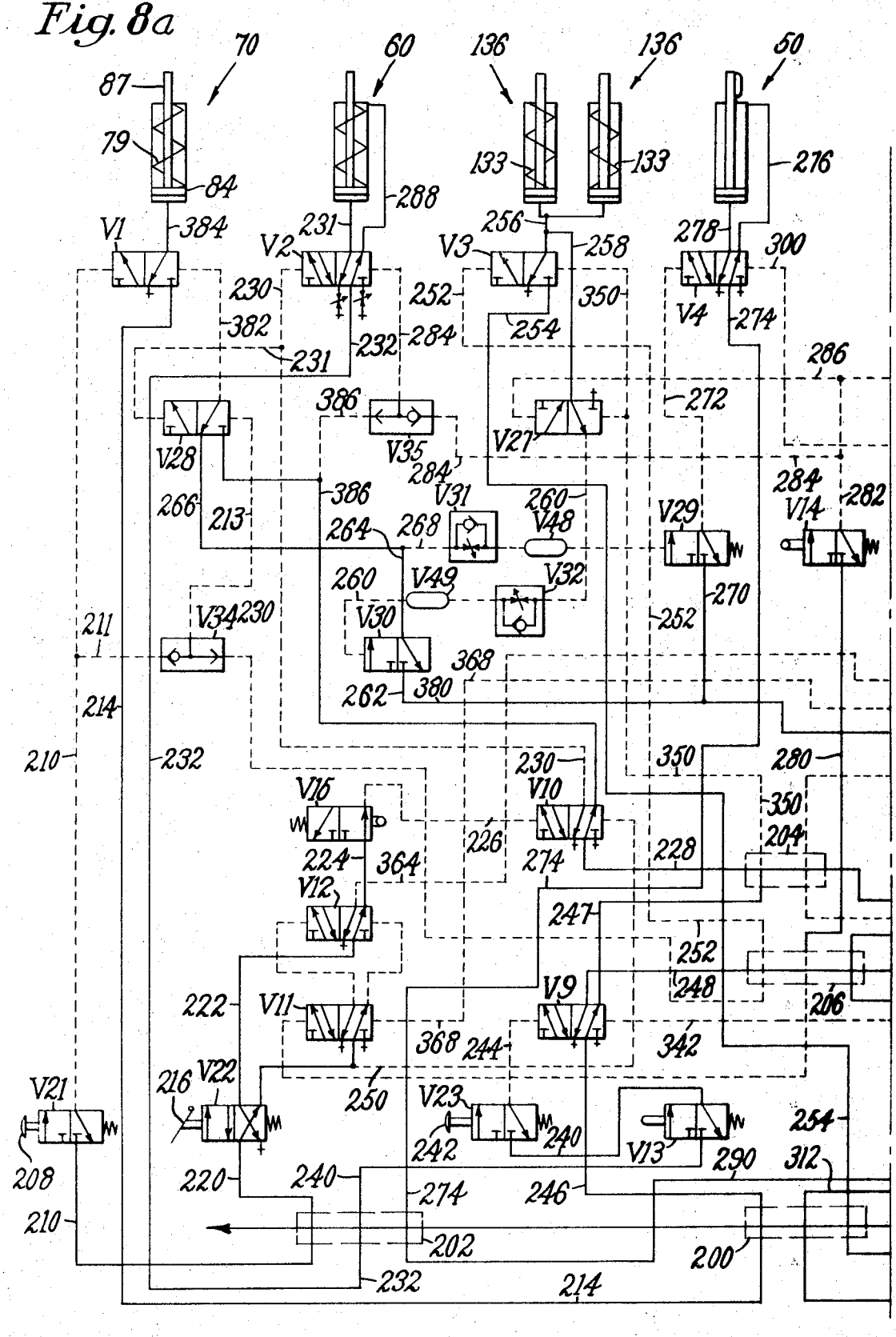

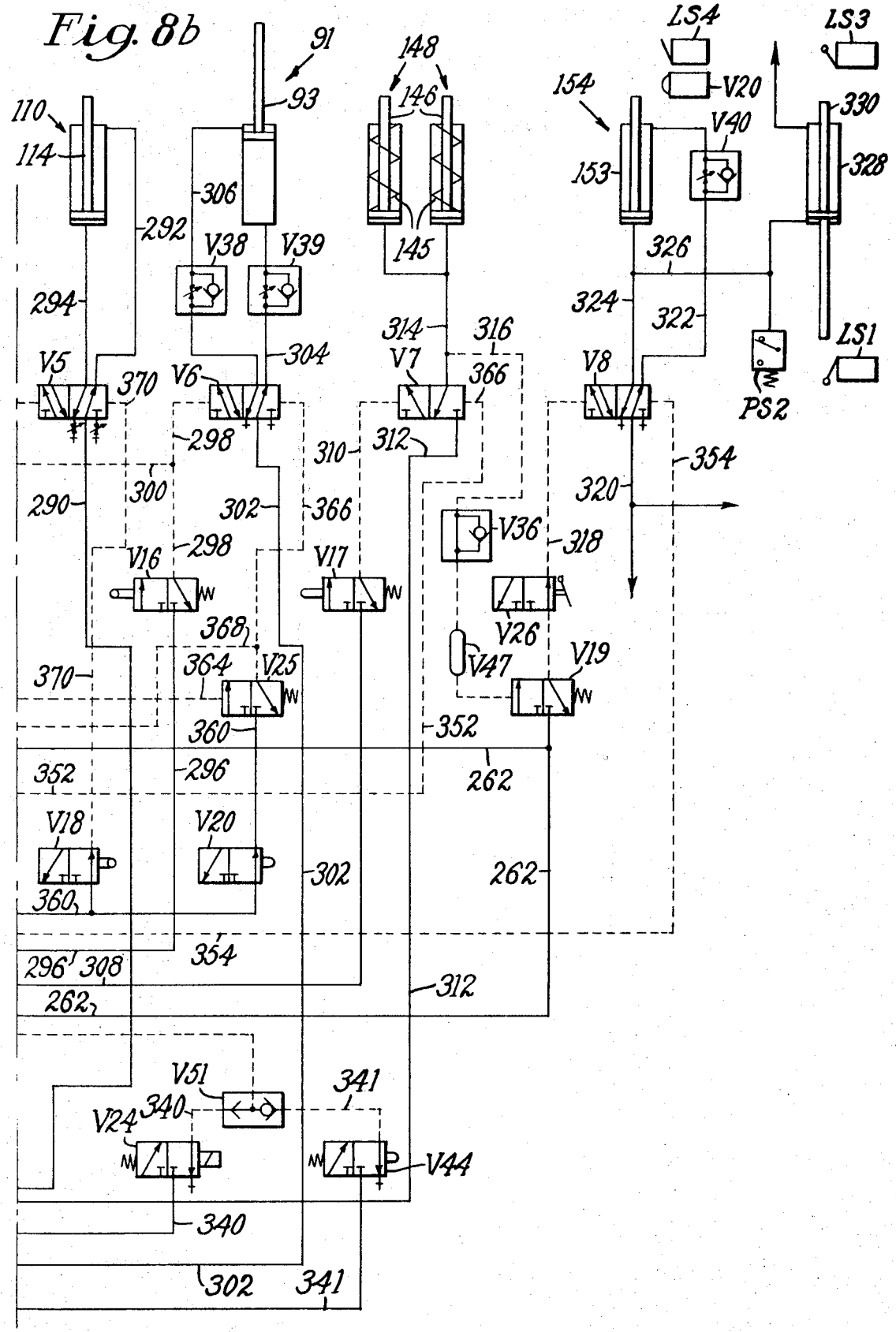

United States Patent Office 3,545,022
Patented Dec. 8, 1970

3,545,022
SHOE MACHINES
Dennis S. Hall, Leicester, England, assignor to USM Corporation, Flemington, N.J., a corporation of New Jersey
Filed Sept. 12, 1969, Ser. No. 857,516
Claims priority, application Great Britain, Sept. 24, 1968, 45,251/68
Int. Cl. A43d 11/00
U.S. Cl. 12—52                                              8 Claims

ABSTRACT OF THE DISCLOSURE

Apparatus for forming a seam between two components of plastic, plastic coated fabric material or other heat sealable material.

The apparatus is particularly adapted to form backseams in shoe uppers and comprises a form member and a presser member movable relative to said form member to clamp mating upper components therebetween. Means for creating a high frequency electric field between the form member and the presser member are provided. Orienting means comprising positioning means movable between a loading position and a releasing position and transfer means movable between a receiving position and an operative position are employed to introduce shoe upper components to the form member. The positioning means includes gauge means for precisely locating the upper components on the positioning means and clamp means for clamping said components on said positioning means. The positioning means, with upper components clamped therein, are pivoted from the loading position to the releasing position wherein the upper components are deposited on the transfer means. The transfer means comprises a temporary form member and means for clamping the upper components thereagainst. The transfer means is movable between a receiving position wherein it receives the upper components from the positioning means and an operative position wherein the upper components are deposited on the form member and released from the temporary form member and clamping means of the transfer means.

BACKGROUND OF THE INVENTION

In the manufacture of a shoe, it is customary to form an upper which is later lasted and attached to a sole of a shoe. The upper is generally formed from pieces of sheet material, usually leather or plastic faced fabric, which are secured together to provide an upper of the desired. Generally in forming an upper, two portions of material termed "quarters" are joined together to provide a backseam which in the completed shoe extends down the back of the heel end portion of the shoe upper. It is usual for the backseam to be provided by stitching the two quarters together. From the foregoing, it is evident that both skill and time are required to provide a back seam which is strong and of pleasing appearance.

With the advent of the use of plastic and similar heat sealable material as shoe upper component material, it has become possible to form back seams other than by the conventional method of stitching the back portion of the two shoe upper quarters.. Our previously issued U.S. Patent, Ser. No. 3,376,594, issued Apr. 9, 1968, discloses apparatus for forming a back seam in heat sealable shoe upper components. Difficulty was encountered, however, in the use of the apparatus of this prior invention in precisely locating shoe upper components in position on the form members. As a consequence, consistent accuracy in the formation of the back seam was not obtained.

The various features of the invention, including various novel details of construction and combinations of parts, will now be more particularly described with reference to the accompanying drawings and pointed out in the claims. It will be understood that the apparatus embodying the invention is shown by way of illustration only and not as a limitation of the invention. The principles and features of this invention may be utilized in varied and numerous embodiments and applications without departing from the scope of the invention.

DESCRIPTION OF THE DRAWINGS

FIG. 6 is a front view of the head shown in FIG. 3, but at a later stage in its operative cycle;

FIG. 7 is an enlarged sectional view taken along the line VII—VII of FIG. 4; and FIGS. 8a and 8b are schematic views of a pneumatic circuit associated with the right hand head.

DESCRIPTION OF THE PREFERRED CONSTRUCTION

Figure 1:
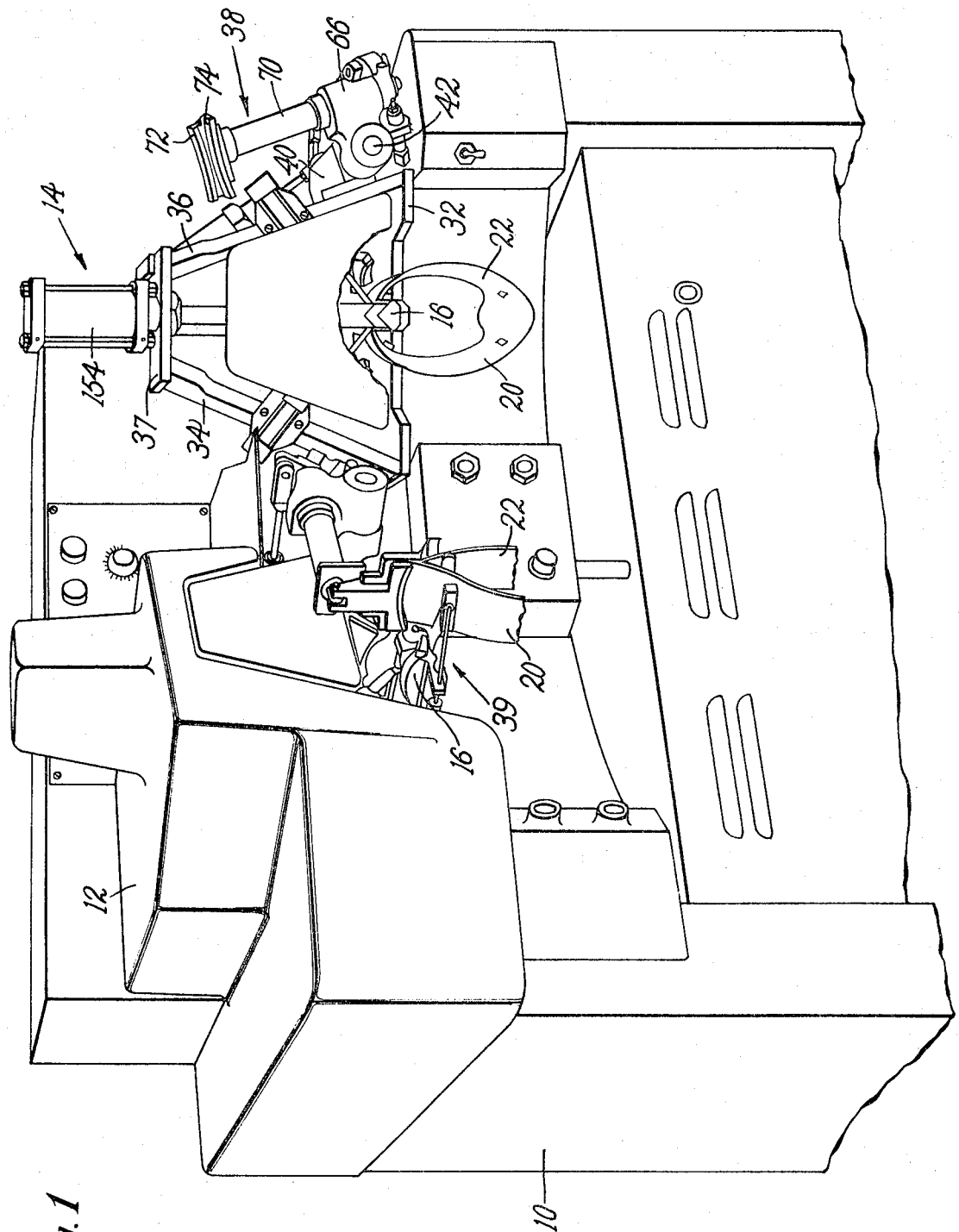
FIG. 1 is a front perspective view of an illustrative apparatus with the cover removed from a right hand head thereof.

The illustrative apparatus, which is particularly adapted forming a curved back seam between two quarter portions of a shoe upper made of plastic coated fabric material, comprises two operating heads 12 and 14 mounted in side by side relation on a fabricated sheet metal cabinet 10. Each operating head 12, 14 is provided with orienting means for accurately positioning the marginal edge portions of two shoe upper quarter portions 20 and 22 in abutting relationship on a form member 16, and high frequency electric heating means for butt welding the abutting marginal edge portions of the quarters to form a back seam therebetween. As shown in FIG. 1, the head 12 is of a construction similar to the head 14 and therefore, for reasons of brevity, only the head 14 will be hereinafter described with particular reference to FIGS. 2 to 8 of the accompanying drawings.

The head 14 comprises a rigid main frame (FIGS. 1, 2, 3, 4 and 6) comprising a generally rectangular base 32 secured to an upper wall of the cabinet 10 and opposite side walls 34 and 36 which extend upwardly from the base 32. A bridge member 37 is secured to the upper end portions of the side walls.

The base 32 is provided with a rectangular aperture 33 (FIG. 2) in a mid-portion thereof. The form member 16 is mounted on the base 32 forwardly of the aperture 33. The form member 16 (FIGS. 3, 4, 6 and 7) comprises two angularly disposed surfaces 24 and 26 which intersect at a right angle. The surfaces 24 and 26 meet along an upwardly facing curved ridge 25 extending lengthwise of the head 14 substantially along a center line thereof. During the operative cycle of the apparatus the quarter portions 20 and 22 are clamped against the surfaces 24 and 26 of the form member 16 with marginal edge portions (FIG. 7) of the quarter portions 20 and 22 respectively extending in abutting relationship along the curved ridge 25.

Figure 2:
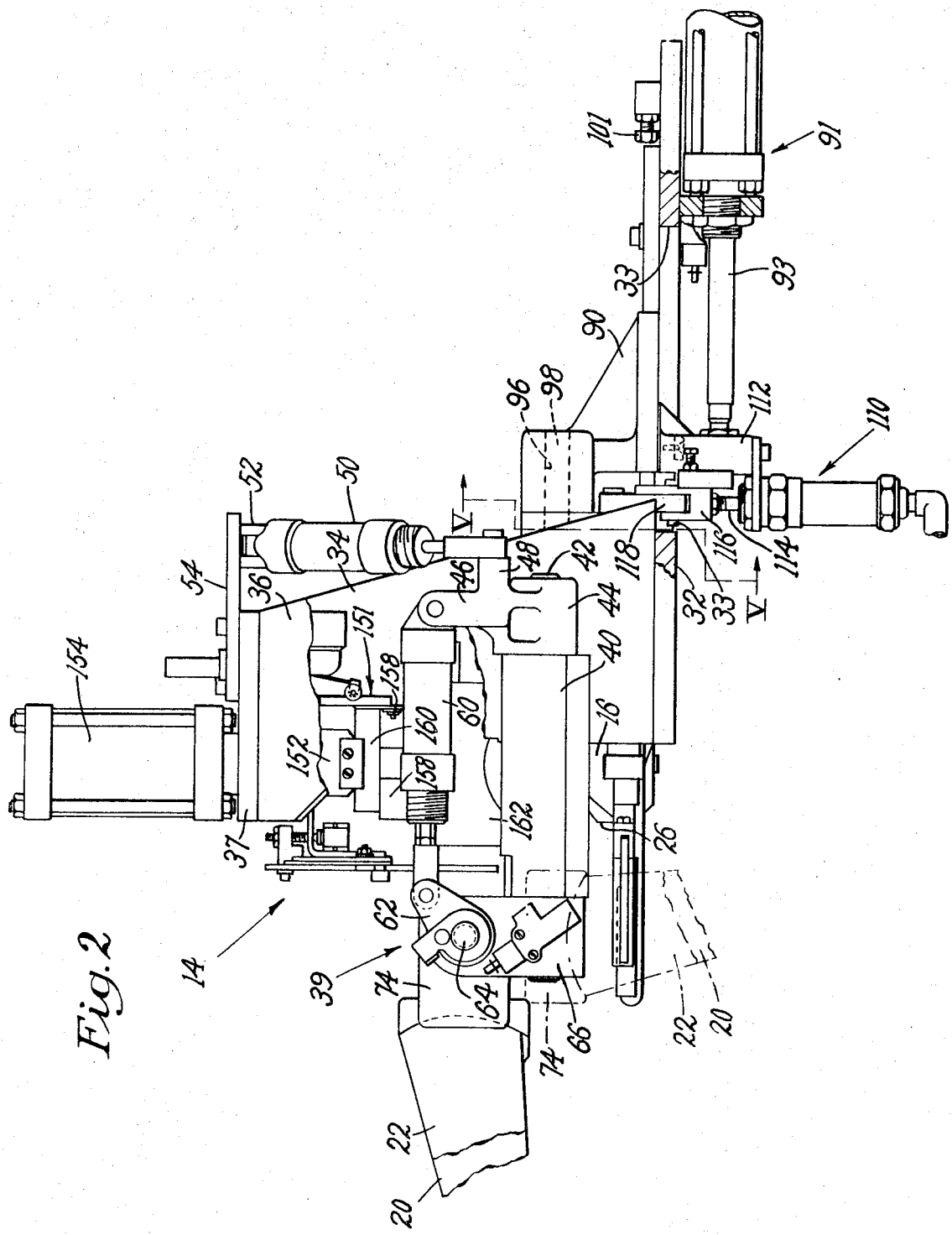
FIG. 2 is a right hand side view of the right hand head of the illustrative apparatus shown at the beginning of an operative cycle thereof.
Figure 4:
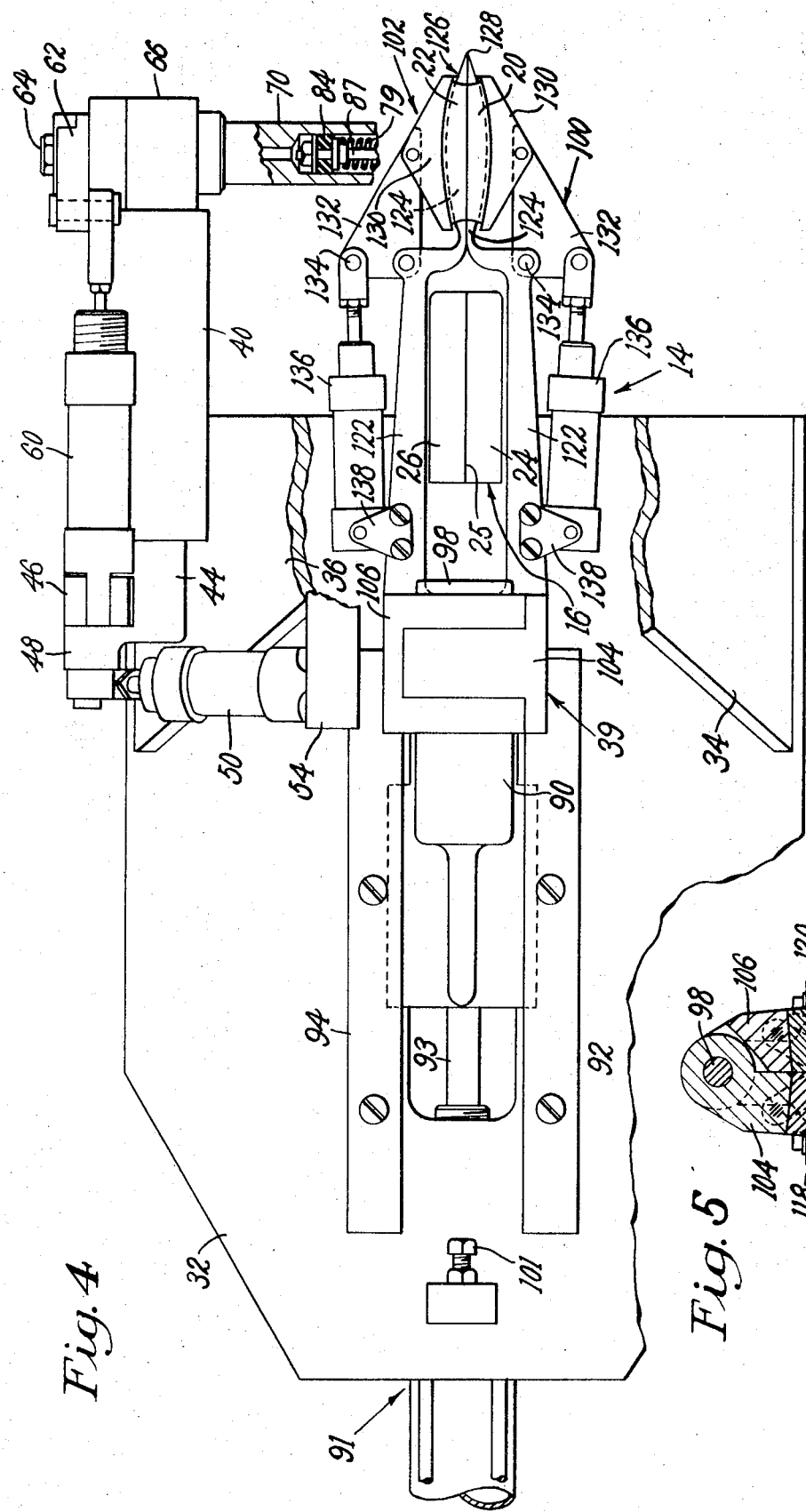
FIG. 4 is a plan view of the head shown in FIG. 2, with some parts broken away.
Figure 5:
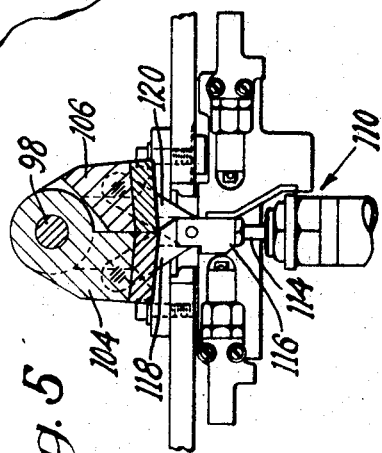
FIG. 5 is a sectional view along the line V—V of FIG. 2.

The orienting means of the head 14 comprise a positioning assembly 38 (FIG. 2) and a transfer assembly 39 (FIG. 4). The positioning assembly is pivotally mounted in a bracket 40 secured to an outwardly facing surface of the side wall 36. The positioning assembly 38 comprises a shaft 42 rotatably received in a bore (not shown) of the bracket 40. Fixedly mounted on an end portion of the shaft 42, rearwardly of the bracket 40, is a fulcrum member 44 comprising two arms 46 and 48 (FIG. 2). The arm 48 extends rearwardly, as viewed in FIG. 2, and provides pivotal support for one end of a piston and cylinder arrangement 50. The opposite end of the arrangement 50 is pivotally supported by a bifurcated lug portion 52 of a rearwardly extending platen 54 mounted on the bridge member 37. The arm 46 of the fulcrum member 44 extends upwardly (see FIG. 2) and provides pivotal support for one end of a forwardly extending piston and cylinder arrangement 60 pivotally connected at its forward end to a link arm 62. The link arm 62 is mounted on a shaft portion 64 (see FIG. 2) of a cylinder assembly 70 (FIG. 4). The shaft 64 is rotatably received in a bore (not shown) of a bracket member 66 secured on a forwardly extending portion of the shaft 42.

Figure 3:
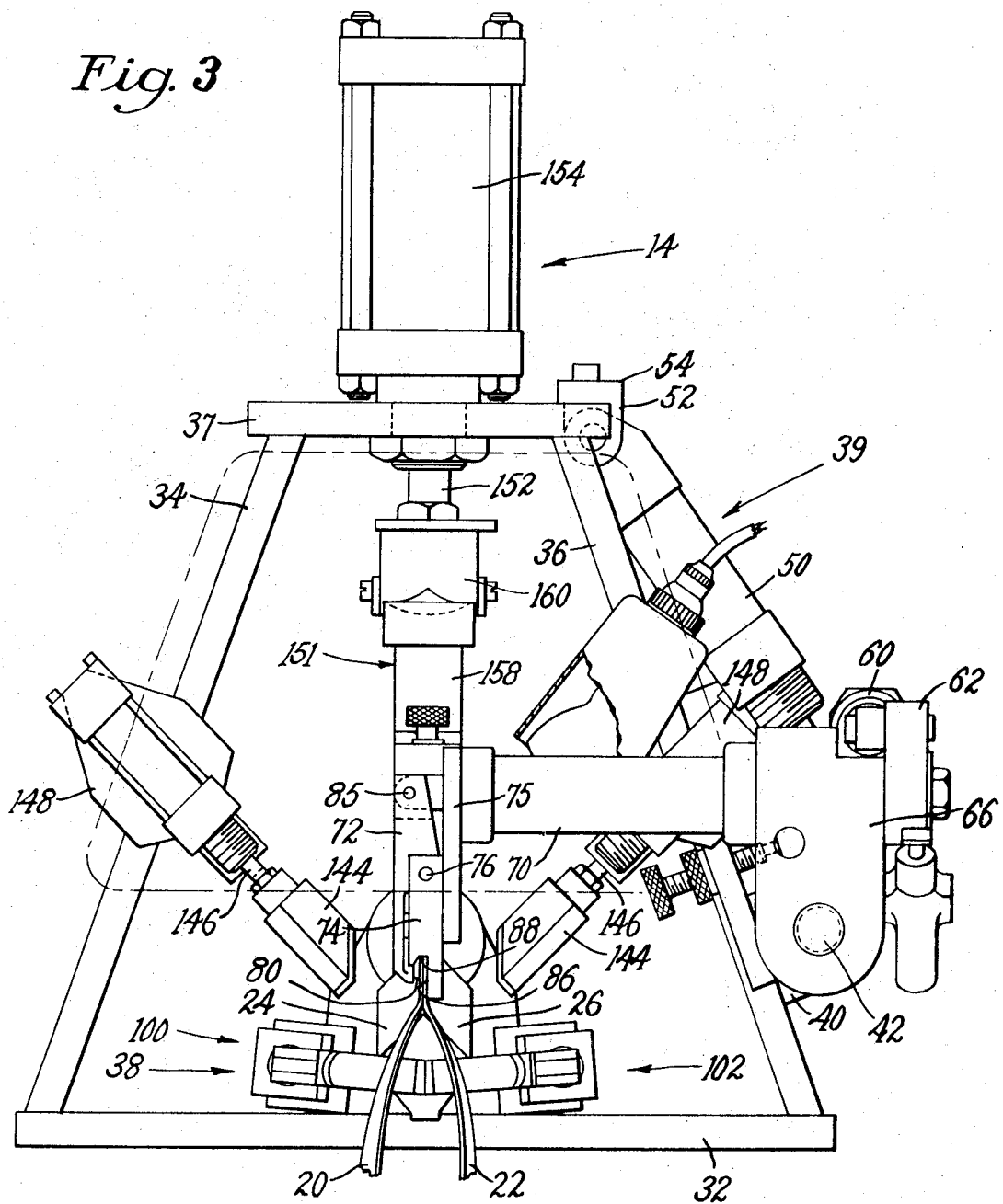
FIG. 3 is a front view of the head shown in FIG. 2 at a later stage in its operative cycle.

Supported at the end of the assembly 70 remote from the link arm 62 are two clamp plates 72 and 74 (FIGS. 2, 3 and 6). The clamp plate 72 is pivotally mounted on a pivot pin 76, secured in lugs formed on the clamp plate 74. The clamp plate 74 is mounted on an arm 75 depending from the cylinder assembly 70. Mounted in the cylinder assembly 70 is a piston 84 FIG. 4) having a piston rod 87 projecting from the cylinder assembly and pivotally connected by a pin 85 (FIG. 3) to an upwardly extending portion of the clamp plate 72 whereby, when the illustrative apparatus is in use, the clamp member 72 may be pivoted on the pin 76. The clamp plate 72 is provided with a clamp surface 80 (FIG. 3) and the clamp plate 74 with a clamp surface 86 and also a gauge surface 88, the arrangement being such that two shoe upper quarter portions 20 and 22 can be placed accurately against the gauge surface 88 and, upon operation of the cylinder assembly 70, clamped between the surfaces 80 and 86 in such a manner that the portions 20 and 22 are arranged one on each side of the center line of the head 14 (see FIG. 3).

The positioning assembly 38 may be moved about the axis of the shaft 42 by means of the piston and cylinder arrangement 50, between an operative position, in which the clamp plates are positioned one on either side of the center line of the head 14 (FIG. 3), and an inoperative position remote therefrom (FIG. 6). The cylinder assembly 70 can also be rotated in the bracket 66 by the piston and cylinder arrangement 60 between a loading position, in which the clamp plates 72 and 74 extend forwardly (see FIG. 2) toward the front of the head 14 and are held open by the cylinder assembly 70 to receive two shoe upper quarter portions, and a releasing position, in which the clamp plates 72 and 74 extend downwardly (see FIG. 3) to present the quarter portions 20 and 22 to the transfer assembly 29 of the orienting means.

The transfer assembly 39 is mounted for movement between a receiving position (FIG. 4), in which two shoe upper quarter portions can be transferred thereto by the positioning assembly as it moves to its releasing position and an operative position wherein the shoe quarter portions 20 and 22 are positioned one on each side of the form member 16 with the curved marginal edge portions thereof respectively extending in abutting relationship along the curved ridge 25 of the form member 16.

The transfer assembly 39 comprises a support bracket 90 (FIGS. 2 and 4) slidably mounted for movement toward and away from the form member 16 between parallel guideways 92 and 94 mounted on the base 32. The bracket 90 is moved by a piston and cylinder arrangement 91 mounted on an underside of the base 32, a piston rod 93 of the arrangement being connected to a depending portion 112 of the bracket 90. The piston and cylinder arrangement 91 is preset to move the bracket 90 forwardly to the receiving position shown in FIG. 4. Rearward movement of the transfer assembly to its operative position is controlled by a stop member 101 mounted on the base 32.

The bracket 90 provides support in a bore 96 (FIG. 2) thereof for a shaft 98 on which two composite clamp arrangements 100 and 102, positioned on opposite sides of the center line of the form member 16, are pivotally mounted. The clamp arrangement 100 comprises a support block 104 (FIGS. 4 and 5) pivotally mounted on the shaft 98 and the clamp arrangement 102 a support block 106 also pivotally mounted on the shaft 98. The assemblies 100 and 102 are thus supported for movement between a receiving location, at which the clamp arrangements receive, when the transfer assembly is in its receiving position (FIG. 4), shoe quarter portions 20 and 22 presented thereto by the positioning assembly, and a releasing location, at which, after the transfer assembly has moved to its operative position, the arrangements release said quarter portions in juxtaposed relationship to the form 16. The clamp arrangements 100 and 102 are arranged to pivot in opposite directions about the axis of the shaft 98. The angular displacement of the arrangements 100 and 102, when in their receiving location, is such that they lie in substantially diametrically opposed relationship (FIG. 3). The arrangement 100 is moved clockwise and the arrangement 102 counterclockwise when moving from their receiving location to their releasing location, in which the angular displacement therebetween is substantially a right angle (see FIG. 6).

Pivotal movement of the clamp arrangements 100, 102 is effected by means of a piston and cylinder arrangement 110 (FIG. 5) mounted on the downwardly extending portion 112 of the bracket 90. A piston rod 114 of the arrangement 110 is connected, at an upwardly projecting bifurcated portion 116 thereof, to two link members 118 and 120 which are pivotally connected to the support blocks 104, 106, respectively, of the clamp arrangements.

Each of the clamp arrangements 100 and 102 comprises a forwardly projecting arm 122 (FIG. 4), forward end portions 124 of which, when the transfer assembly is in its receiving position, abut along inwardly facing surfaces thereof to provide a temporary form 126 against which the quarter portions 20 and 22 can be clamped. The form 126 has a forwardly extending apex portion 128 which separates the quarter portions 20 and 22 so that they lie on opposite sides of the form 126 when the positioning assembly, together with quarter portions clamped therein, is pivoted from its loading position to its releasing position.

Each of the clamp arrangements 100 and 102 comprises a clamp member 130 pivotally mounted on a link 132 pivotally secured to a lug 134 formed on a mid-portion of the arm 122. Each link 132 is pivotally connected to one end of an associated rearwardly extending piston and cylinder arrangement 136, said arrangements being pivotally secured to lugs 138 mounted on the arms 122 (see FIG. 4). The clamp members 130 are effective, upon actuation of the arrangements 136, to clamp the quarter portions 20 and 22 against the portions 124 of the form 126.

The form member 16 is fixedly mounted on the base 32 forwardly of the aperture 33 (FIG. 2) and thus lies in the path of the rearward movement of the transfer assembly. When the transfer assembly is in its receiving position (see FIG. 4) the arms 122 surround the form member 16. When the transfer assembly is in its operative position the portions 124 of the arms 122 are positioned on opposite sides of the form 16, shoe portions 20 and 22 held by the clamp arrangements 100, 102 lying in contact with the surfaces 24 and 26 of the form member 16.

The head 14 of the illustrative apparatus also comprises two clamp pads 144 (FIGS. 3 and 6) supported on piston rods 146 of two piston and cylinder arrangements 148 secured one to each of the walls 34 and 36.

When the illustrative apparatus is in use and the transfer assembly is in its operative position, the clamp pads 144 are moved, upon actuation of the piston and cylinder arrangements 148, to clamp shoe quarter portions 20 and 22, held by the clamp arrangements 100 and 102, against the surfaces 24 and 26 of the form member 16, the curved marginal edge portions of the quarter portions being positioned in juxtaposed relationship along the curved ridge 25 of the form member (FIG. 7).

The head 14 of the illustrative apparatus is further provided with an upper electrode clamp assembly 151 (FIGS. 2, 3 and 6) mounted for movement towards and away from the form member 16 on a piston rod 152 of a piston and cylinder arrangement 154 mounted in the bridge member 37. The electrode assembly 151 comprises a support 160 secured to the piston rod 152 and carrying two insulators 158 on which a block 162 is fixedly mounted. The block 162 is provided with downwardly facing surfaces which are complementary in shape to the upwardly facing surfaces 24 and 26 of the form member 16. The block 162 is coated with a layer of rubber 163 of uniform thickness. When the illustrative apparatus is in use and shoe upper quarter portions 20 and 22 have been clamped against the form member 16 of the head 14, actuation of the piston and cylinder arrangement 154 is effective to cause movement of the block 162 into engagement with the shoe quarter portions 20 and 22 clamped on the form 16.

The heating means of the illustrative apparatus comprises a generator (not shown) for creating a high frequency electric field between the block 162 of the electrode assembly and the form member 16 which acts as the second electrode. The upper electrode is insulated from the remainder of the apparatus by the insulators 158.

The head 14 is provided with control means which, when the apparatus is in use, control the sequence of movements of the orienting means in positioning two shoe upper quarter portions 20 and 22 accurately on the form member 16 prior to a backseam being formed between marginal edge portions thereof.

In using the illustrative apparatus, the operator, is merely required to place the quarter portions 20 and 22 into the positioning assembly 38 and to remove the finished product upon completion of the back seam forming operation; no other handling of the quarter portions by the operator is necessary.

A cycle of operation of the illustrative apparatus includes operative cycles of both heads 12 and 14 which are carried out in a similar manner, there being corresponding pneumatic circuitry and components associated with the control means of the heads 12 and 14 for effecting said operative cycles; only an operative cycle of the head 14 will therefore be described in detail with particular reference to FIG. 10.

OPERATIVE CYCLE—GENERAL DESCRIPTION

Conveniently when the illustrative apparatus is in use, the operator positions two quarter portions in the positioning assembly 38 which is in its loading position and causes said portions to be clamped thereby. The positioning assembly is then caused to pivot into its releasing position. The quarter portions are transferred, during such pivotal movement, into the clamp arrangements of the transfer assembly 39 which is in its receiving location, with the clamp arrangements being in their receiving position. The clamp arrangements 100, 102 of the transfer assembly are then caused to clamp the quarter portions and the positioning assembly to release them. The transfer assembly then moves to its operative position. With the quarter portions positioned against the surfaces of the form member 16, with their edge portions abutting along which a seam is to be formed, the clamp pads 144 are moved into engagement with the quarter portions and the transfer assembly is then caused to release said portions.

With the quarter portions thus clamped against the surfaces of the form member 16, the electrode assembly 151 is moved downwardly into engagement with the quarter portions and while pressure is applied thereby a high frequency electric field is created between the electrode assembly and form member whereby a seam is formed between the abutting edges of the quarter portions.

OPERATIVE CYCLE—DETAILED DESCRIPTION

When the pneumatic circuit is switched on, air under pressure is admitted to manifold blocks 200, 202 and 204 and lines associated therewith (see FIGS. 8a and 8b). With the orienting means of the head 14 in the position shown in FIG. 2, the clamp plates 72 and 74 thereof being in their loading position, the operator positions a pair of plastic coated fabric quarter portions 20 and 22 with their fabric surfaces abutting between the clamp plates 72 and 74 and with their marginal edge portions placed in juxtaposed relationship with the gauge surface 88 of the clamp plate 74.

When satisfied with the positioning of the quarter portions 20 and 22 the operator momentarily depresses a knob 208 to switch a valve V21. Switching of the valve V21 (to the right in FIG. 10) provides a path along a line 210 for air under pressure to pass from the manifold block 202 to actuate a valve V1, actuation of the valve V1 providing a path, through a line 214 from the manifold 200, for air under pressure to the cylinder assembly 70 whereby the piston 84 is effective, through the piston rod 87, to cause the clamp plate 72 to be moved towards the clamp plate 74 thus to clamp the shoe quarter portions 20 and 22 therebetween. The line 210 is provided with a branch line 211 leading to a shuttle valve V34 through which, when the line 210 is fully pressurized, air under pressure can pass to a line 213 to hold a valve V28, in its position shown in FIG. 10.

The operator now releases his hold on the now clamped quarter portions 20 and 22 and depresses a foot pedal 216 thereby switching a valve V22 and providing a path from a line 220, leading from the manifold block 202, to a line 222. Air under pressure can then flow through a valve V12, a line 224, a valve V15 and a line 226 to switch a valve V10. Switching the valve V10 provides a path from a line 228 leading from the manifold block 204 through a line 230 to switch a valve V2, and also through a branch line 231 to switch the valve V28 from its position shown in FIG. 10, the pressure in the line 231 now exceeding that in the line 213 since the knob 208 has been released.

Switching of the valve V2 provides a path from the block 202, through a line 232 and a line 234, to a lower end (FIG. 10) of the piston and cylinder arrangement 60, thereby effecting, through the link arm 62, rotational movement of the clamp plates 72 and 74 about the axis of the shaft 64. The clamp plates 72 and 74 are thus moved from their loading position to their releasing position (shown in dotted line in FIG. 2), a valve V13 associated therewith being switched as the plates 72 and 74 move to said shoe quarter portion releasing position.

If, when the clamp plates 72 and 74 are moved to their releasing position, the operator is not satisfied with the positioning of the quarter portions 20 and 22, he can, by removing his foot from the foot pedal 216, cause the positioning assembly to be returned to its initial loading position at which the quarter portions can be repositioned, releasing the foot pedal 216 before a knob 242 is depressed providing a path through a line 250 whereby the valve V10 is reset to the condition shown in FIG. 10, and thus providing a path through the valve V10, a line 380, the valve V28, and a line 382 thus to reset the valve V1, whereupon air under pressure in a line 384 is exhausted and a return spring 79 in the cylinder assembly 70 is thus effective to cause the clamp plate 72 to move away from the clamp plate 74 thus to release the quarter portions 20 and 22. Air under pressure in the line 380 also passes along a branch line 386 and through a shuttle valve V35 to a line 284 whereby the valve V2 is reset to the condition shown in FIG. 10, thereby providing a path from the line 232 and through a line 288 to the piston and cylinder arrangement 60, thus causing the clamp plates 72 and 74 to be rotated from their releasing position back to their loading position. Thus upon opening of the clamp plates the work can be repositioned and the operative cycle recommenced.

With the quarter portions properly positioned, the clamp plates 72, 74 in their releasing position, the quarter portions extending on opposite sides of the form 126, and with the valve V13 switched as aforesaid to allow air under pressure along a line 240 to a valve V23, the operator now momentarily depresses a knob 242 thereby actuating the valve V23 and providing a path from the line 240 to a line 244 thereby causing a valve V9 to be switched. Switching the valve V9, to the right see FIG. 10, cuts off the supply of air under pressure from the manifold block 200 through a line 246 the valve V9 and a line 247 to the manifold block 206, and redirects it along a line 248 to a manifold block 206. The foot pedal 216 can now be released and the valve V22 returns to the condition shown in FIG. 10, so that air under pressure can now flow from the line 220 through the line 250 to switch the valve V10 back to the condition shown in FIG. 10. Air under pressure can now also flow through a valve V11 to reset the valve V12 to the condition shown in FIG. 10.

With air under pressure supplied to the manifold block 206, it passes through a line 252 to switch a valve V3 thus providing a path through a line 254 from the manifold block 209, and through a line 256 to the piston and cylinder arrangements 136, whereby the clamp members 130 are caused to swing towards the temporary form 126 and so clamp the quarter portions 20 and 22 thereagainst. Air under pressure also flows through a branch line 258, a valve V27, a line 260, and valves V32 and V49 situated therein, thus to switch a valve V30 to the right viewing FIG. 10. Switching of the valve V30 provides a path through a line 262 from the manifold block 206, and through a line 264 and a branch line 266 and the valve V28 to reset the valve V1 to the condition shown in FIG. 10. Also air under pressure passes through a branch line 268 through valves V31 and V48 to switch a valve V29. Resetting the valve V1 isolates the line 214 from the piston and cylinder arrangement 84 and the clamp plate 72 is pivoted by the spring 79 away from the clamp plate 74 thus to unclamp the quarter portions 20 and 22 held thereby.

The quarter portions 20 and 22 now being free of the clamp plates 72 and 74 and the valve V29 being switched to the right (viewing FIG. 10), air under pressure passing from a branch line 270 of the line 262 through the valve V29 and a line 272 is effective to switch a valve V4 whereby air under pressure supplied through a line 274 from the manifold block 202 passes through the valve V4 and a line 278 to the lower end of the piston and cylinder arrangement 50 whereby the fulcrum member 44, the shaft 42 and the cylinder assembly 70 of the positioning assembly are moved clockwise about the axis of the shaft 42 and the positioning assembly is thus moved to its inoperative position.

As the positioning assembly moves to its inoperative position a valve V14 is switched (to the right viewing FIG. 10), and air under pressure can thus pass through a line 280 from the manifold block 206 and through a line 282 to switch a valve V5. Air under pressure also passes through the line 284, from which it passes through a valve V35 to reset the valve V2 in its condition shown in FIG. 10, and through a branch line 286 to switch a valve V27. Resetting the valve V2 provides a path to pass from the line 232 through the line 288 to the piston and cylinder arrangement 60, whereby to cause the clamp plates 72 and 74 to be swung from their releasing position to their loading position. Switching the valve V27 (to the right in FIG. 10) exhausts the line 260 thus allowing the valve V30 to return to the condition shown in FIG. 10 and in turn causing the lines 264, 266 and 268 to be exhausted. Exhausting the line 268 causes the valve V29 to return to the condition shown in FIG. 10, thus exhausting also the line 272.

When the valve V5 is switched (by actuation of the valve V14), air under pressure supplied through a line 290 from the manifold block 202 passes through a line 294 to a bottom end of the piston and cylinder arrangement 110 whereby to cause the support blocks 104, 106 to pivot about the axis of the shaft 98 and thus to cause the clamp arrangements 100 and 102 to be moved clockwise and counterclockwise respectively about said axis (viewing FIG. 2) from their receiving location to their releasing location. The marginal edge portions of the quarter portions 20 and 22 respectively are brought into abutting relationship as the clamp arrangements 100 and 102 reach their releasing location. At this time the transfer assembly is in its receiving position.

As the piston rod 114 associated with the piston and cylinder arrangement 110 is extended, a sequence valve V16 switched thereby provides a path through a line 296 from the manifold block 206, and through a line 298 to switch a valve V6, and through a branch line 300, to cause, since the line 272 is now exhausted, the valve V4 to be returned to the condition shown in FIG. 10, thereby allowing air under pressure from the line 274 to pass to a line 276 and thus to the piston and cylinder arrangement 50 whereby to cause the positioning assembly to be moved counterclockwise about the axis of the shaft 42 back to its operative position. The valve V14 is also switched as the positioning assembly moves, and thus the lines 282, 284 and 286 are exhausted. Switching the valve V6 allows air under pressure to pass through a line 302 from the manifold block 200 along a line 306 and through a restrictor valve V38 an upper end of the piston and cylinder arrangement 91, whereby the transfer assembly is caused to move to its operative position.

When the transfer assembly reaches its operative position, the quarter portions 20 and 22 are positioned one on each side of the form member 16, the fabric surfaces of the quarter portions 20 and 22 being constrained to lie against the surfaces 24 and 26 respectively and the marginal edge portions of the quarters extending in abutting relationship along the curved ridges 25 of the form member 16.

Movement of the transfer assembly to its operative position causes a valve V17 to be switched, thereby providing a path through a line 308 from the manifold block 206, and through a line 310 to switch a valve V7, thereby in turn providing a path through a line 312 from the manifold block 200, and through a line 314 and then to the piston and cylinder arrangements 148, thereby causing the clamp pads 144 to be moved towards the surfaces 24 and 26 of the form member 16 into clamping engagement with the quarter portion 20 and 22. Air under pressure also passes through a branch line 316, and through a restrictor valve V36 and a valve V47, to switch a valve V19, thus providing a path from the line 262, through an upper electrode isolating valve V26, to a line 318 to switch a valve V8. Switching the valve V8 (to the right, viewing FIG. 10) provides a path from a line 320, associated with the pneumatic circuit of the head 12 of the illustrative apparatus, through a line 324 to a lower end (FIG. 10) of the piston and cylinder arrangement 154 thereby causing the electrode assembly 151 to be moved downwardly towards the form member 16. Air under pressure in the line 324 also passes through a branch line 326 to an interlock cylinder 328 and a pressure switch PS2. As the assembly 151 moves downwardly (FIG. 2) a limit switch LS4 is tripped which, in conjunction with a limit switch LS3, tripped by a piston rod 330 associated with the interlock cylinder 328, and the pressure switch PS2, prevents erroneous actuation of a welding cycle of the heating means.

The generator of the heating means includes an alternating oscillator arrangement whereby an oscillator in a circuit associated with the head 14 will not be energized at the same time as an oscillator in a corresponding circuit associated with the head 12; thus accidental or erroneous tripping of both heating circuits at the one time is impossible.

When the electrode assembly 151 has moved into engagement with the quarter portions 20 and 22 to clamp them against the form member 16, and when the switches LS3, LS4 and PS2 are actuated, one oscillator of the generator is energized and a high frequency electric field is created in the area of the abutting marginal edge portions of the quarter portions 20 and 22, thereby causing them to become bonded together to form a backseam of a shoe upper which is both strong and eyeable.

When the welding cycle is complete, a valve V24 is switched thereby providing a path through a line 340 from the block 200, and through a check valve V51 and a line 342, thus to switch the valve V9 to the condition shown in FIG. 10. Switching the valve V9 is effective to cause the line 248 and thus the manifold block 206 to be exhausted, and air under pressure to be supplied through the line 247 to the manifold block 204. Air under pressure now passes through a line 350 to reset the valve V3, whereby the line 256 is exhausted, and thus, are under the influence of return springs 133 of the piston and cylinder arrangements 136, the quarter portions 20 and 22 held by the clamps 130 are released. Air under pressure in the line 350 also resets the valve V27, while air under pressure supplied through lines 352 and 354 from the manifold block 304, is effective to return the valves V7 and V8 respectively to their condition shown in FIG. 10. Switching the valve V7 allows the line 314 to be exhausted, and thus under the influence of return springs 145 of the piston and cylinder arrangements 148, the clamp pads 144 are moved upwardly away from the surfaces 24 and 26 of the form member 16. At the same time switching of the valve V8 allows the lines 234 and 236 to be exhausted, air under pressure being supplied along a line 322 and through a restrictor valve V40 to the piston and cylinder arrangement 154, whereby to move the upper electrode clamp assembly 151 upwardly whereupon a sequence valve V20 is tripped to allow air under pressure from the manifold block 204 through a line 360 to a sequence valve V25. The completed workpiece can now be removed from the head 14.

The head 14 of the illustrative apparatus is provided with a safety device associated with the electrode assembly 151, which device comprises (see FIG. 6) a bracket 402 fixedly mounted on and extending forwardly from the assembly 151. The bracket 492 provides support for an electrode guard support plate 404 which is held against a forward face of the bracket 402 by two retaining screws 406. The screws 406 pass through slots 408 provided in the plate 404 and springs 410 acting between the bracket 402 and the plate 404 urged upper end faces of the slots 408 (see FIG. 6) into engagement with the screws 406. The safety device further comprises a transparent guard member 412 mounted on the support plate 404, the arrangement being such that when the head is in use the guard member 412 is movable with the upper electrode clamp assembly 151 to an operative position in which it shields the block 162 while a welding portion of an operative cycle of the head 14 is being performed. If an alien object or the operator's hand becomes trapped as the guard member 412 moves downwardly with the assembly 151, the guard member 412 and the plate 404 are caused to move upwardly against the action of the springs 410. When the guard member 412 moves uninterruptedly a lug thereof is maintained in engagement with a safety valve V44 situated in a line 341 between the manifold block 200 and the valve V51, said valve V44 being thus maintained in the condition shown in FIG. 10. If, however, downward movement of the guard member 412 is hindered the lug thereof ceases to maintain the valve V44 in the condition shown in FIG. 10, the valve V44 being thus spring urged to the right (viewing FIG. 10), thereby providing a path from the manifold block 200 to the valve V51 and thus through the line 342 to switch the valve V9. Switching the valve V9 is effective as just hereinbefore described, to cause the head 14 to return to a condition in which the shoe upper quarter portions can be readily removed therefrom. The cause of the obstruction can then be removed so that a subsequent operative cycle may be proceeded with.

To prepare the head 14 for a next operative cycle the operator once again depresses the foot pedal 216 whereupon air under pressure flows, from the line 220 through the line 222 and the valve V12, to a line 364, whereby the valve V25 is switched to allow air under pressure from the line 360 to pass to lines 366 and 368 thus to reset the valves V6 and V11 respectively.

Resetting the valve V6 provides a path from the line 302 and a line 304 to the piston and cylinder arrangement 91 thus to cause the transfer assembly to be moved to its receiving position. As the transfer assembly moves to its receiving position a sequence valve V18 is reset, to the condition shown in FIG. 10, and air under pressure in the line 360 can now pass through a line 370 whereby the valve V5 is also reset to the condition shown in FIG. 10. Resetting the valve V5 allows pressure fluid in the line 290 to pass through a line 292 to the piston and cylinder arrangement 110, thereby moving the piston rod 114 and rotating the clamp arrangement 100 and 102 from their quarter portion releasing location to their quarter portion receiving location in preparation for a next operative cycle of the head 14. As the arrangement 100 and 102 reach their quarter portion receiving location a sequence valve V15 is tripped, as shown in FIG. 10. Thus the head 14 is now ready for a next operative cycle in a cycle of operation of the illustrative apparatus.

Having thus described my invention what I claim as new and desire to secure by Letters Patent of the United States is:

1. Apparatus for forming a seam between two work pieces comprising a form member, a presser member movable to a position adjacent said form member to clamp two work pieces to be seamed therebetween, and orienting means for locating said work pieces in precise positions on said form member comprising positioning means and transfer means, said positioning means being movable betwen a loading position and a releasing position wherein said work pieces are deposited on said transfer means, said transfer means being movable between a receiving position and an operative position wherein said work pieces are deposited on said form member, said positioning means comprising guage means for accurately positioning said work pieces in said positioning means and clamp means for retaining said work pieces on said positioning means.

2. Apparatus accordng to claim 1 wherein the positioning means includes means for pivoting the clamp means and work pieces clamped therein as a unit between the loading position and the releasing position wherein the work pieces are precisely oriented relative to said transfer means.

3. Apparatus according to claim 1 wherein the transfer means comprise a temporary form member upon which work pieces are supported during translation of the transfer means from the receiving position to the operative position and means for clamping the work pieces in position on said temporary form member.

4. Apparatus according to claim 1 wherein means are provided for creating a high frequency electric field between said form member and said presser member.

5. Apparatus according to claim 1 particularly adapted for the formation of a backseam between two shoe upper quarters wherein said form members comprises two angularly disposed surfaces, the intersection of which forms a curved ridge.

6. Apparatus according to claim 1 wherein means are provided for moving said positioning means between an inoperative position remote from the form member and transfer means and an operative position wherein the positioning means are movable between the loading position and the releasing position.

7. Apparatus according to claim 3 wherein said temporary form member has a forward apex portion which separates work pieces so that they lie on opposite sides of the temporary form member when the positioning means, with the work pieces clamped therein, is pivoted from the loading position to the releasing position.

8. Apparatus according to claim 1 wherein clamp pads are provided for clamping the work pieces against the form member.

References Cited

UNITED STATES PATENTS

| | | | |
|---|---|---|---|
| 2,313,148 | 3/1943 | Ioannilli et al. | 12—52 |
| 2,736,047 | 2/1956 | Roske | 12—59.5 |
| 3,376,594 | 4/1968 | Hall | 12—146 |

PATRICK D. LAWSON, Primary Examiner